US010611469B2

(12) United States Patent
Peng et al.

(10) Patent No.: US 10,611,469 B2
(45) Date of Patent: Apr. 7, 2020

(54) ROTORCRAFT AND ASSEMBLY AND DISASSEMBLY STRUCTURE FOR FOOT STAND AND AIRFRAME OF ROTORCRAFT

(71) Applicant: GUANGZHOU XAIRCRAFT TECHNOLOGY CO., LTD., Guangzhou (CN)

(72) Inventors: Bin Peng, Guangzhou (CN); Dingfeng Xiao, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 620 days.

(21) Appl. No.: 15/484,194

(22) Filed: Apr. 11, 2017

(65) Prior Publication Data
US 2017/0217570 A1    Aug. 3, 2017

Related U.S. Application Data

(63) Continuation of application No. PCT/CN2015/091753, filed on Oct. 12, 2015.

(30) Foreign Application Priority Data

Oct. 27, 2014   (CN) .................... 2014 2 0626211 U
Oct. 27, 2014   (CN) .................... 2014 2 0631048 U
Oct. 27, 2014   (CN) .................... 2014 2 0631071 U

(51) Int. Cl.
*B64C 25/08*        (2006.01)
*H02K 9/06*         (2006.01)
(Continued)

(52) U.S. Cl.
CPC .............. *B64C 25/08* (2013.01); *B64C 1/069* (2013.01); *B64C 25/52* (2013.01); *B64C 25/58* (2013.01);
(Continued)

(58) Field of Classification Search
CPC ......... B64C 25/08; B64C 25/52; B64C 27/04; B64C 27/08; B64D 27/26; Y10T 403/32713; Y10T 403/598; Y10T 403/599
See application file for complete search history.

(56) References Cited

U.S. PATENT DOCUMENTS 3,458,739 A    7/1969   Zelinski et al.
3,885,888 A    5/1975   Warhol
(Continued)

FOREIGN PATENT DOCUMENTS

CN    202550802    11/2012
CN    203318680    12/2013
(Continued)

OTHER PUBLICATIONS

USPTO, Office Action for U.S. Appl. No. 15/484,395, dated Apr. 10, 2019.
(Continued)

*Primary Examiner* — Daniel J Wiley
(74) *Attorney, Agent, or Firm* — Hodgson Russ LLP

(57) ABSTRACT

A rotorcraft and an assembly and disassembly structure for a foot stand and an airframe of a rotorcraft are provided. The foot stand is disposed to a bottom of the airframe, the airframe has an accommodating groove, a top wall of the accommodating groove is provided with a hole, and a side wall of the accommodating groove is provided with a clamping slot, and the assembly and disassembly structure includes a fixing stand fixedly connected to the foot stand and accommodated in the accommodating groove; a plug pin movably mounted into the fixing stand, in which a portion of the plug pin passes through an upper surface of the fixing stand and forms an insertion end, and the insertion
(Continued)

end matches the hole and is inserted into the hole; and an elastic component mounted in the fixing stand and connected to the plug pin.

20 Claims, 9 Drawing Sheets

(51) Int. Cl.
 B64C 39/02 (2006.01)
 B64C 27/08 (2006.01)
 B64C 1/06 (2006.01)
 B64C 25/58 (2006.01)
 B64D 27/26 (2006.01)
 B64C 25/52 (2006.01)
 B64D 33/08 (2006.01)
 B64C 25/32 (2006.01)

(52) U.S. Cl.
 CPC ............ *B64C 27/08* (2013.01); *B64C 39/024* (2013.01); *B64D 27/26* (2013.01); *B64D 33/08* (2013.01); *H02K 9/06* (2013.01); *B64C 2025/325* (2013.01); *B64C 2201/027* (2013.01); *B64C 2201/042* (2013.01); *B64C 2201/108* (2013.01)

(56) References Cited

U.S. PATENT DOCUMENTS

| | | |
|---|---|---|
| 6,384,494 B1 | 5/2002 | Avidano et al. |
| 6,570,276 B1 | 5/2003 | Morel et al. |
| 6,700,235 B1 | 3/2004 | McAfee |
| 7,347,674 B2 | 3/2008 | Terry et al. |
| 7,541,701 B2 | 6/2009 | Lin et al. |
| 8,322,648 B2 | 12/2012 | Kroetsch et al. |
| 8,774,982 B2 | 7/2014 | Oakley et al. |
| 2002/0141888 A1 | 10/2002 | Bostwick |
| 2004/0189111 A1 | 9/2004 | Cichetti, Sr. |
| 2005/0067500 A1 | 3/2005 | Hong et al. |
| 2007/0194173 A1 | 8/2007 | Paasche |
| 2008/0030087 A1 | 2/2008 | De Filippis et al. |
| 2009/0136357 A1 | 5/2009 | Vadillo |
| 2009/0283629 A1 | 11/2009 | Kroetsch et al. |
| 2010/0176670 A1 | 7/2010 | Gottfried |
| 2012/0001503 A1 | 1/2012 | Owng et al. |
| 2012/0083945 A1 | 4/2012 | Oakley et al. |
| 2013/0287577 A1 | 10/2013 | Lin et al. |
| 2014/0000279 A1 | 1/2014 | Brousseau et al. |
| 2014/0097715 A1 | 4/2014 | Hall et al. |
| 2014/0117149 A1 | 5/2014 | Zhou et al. |
| 2015/0129711 A1 | 5/2015 | Caubel |
| 2015/0321755 A1 | 11/2015 | Martin et al. |

FOREIGN PATENT DOCUMENTS

| | | |
|---|---|---|
| CN | 203461089 | 3/2014 |
| CN | 203601563 | 5/2014 |
| CN | 103908785 | 7/2014 |
| CN | 204223174 | 3/2015 |
| CN | 204223176 | 3/2015 |
| CN | 204223187 | 3/2015 |
| EP | 0948116 | 10/1999 |
| EP | 2333347 | 6/2011 |
| EP | 2772429 | 9/2014 |
| GB | 2483881 | 3/2012 |
| KR | 20110123103 | 11/2011 |
| WO | 9907999 | 2/1999 |
| WO | 2012125895 | 9/2012 |

OTHER PUBLICATIONS

ISA/CN, International Search Report for PCT/CN2015/091753.
USPTO, Office Action for U.S. Appl. No. 15/484,395, dated Aug. 23, 2019.
WIPO, English translation of the ISR/WO for PCT/CN2015/091753, Jan. 18, 2016.
APO, Office Action for AU Application No. 2017203550, dated Jun. 13, 2018.
APO, Office Action for AU Application No. 2015341237, dated Jul. 17, 2018.
APO, Office Action for AU Application No. 2017203554, dated Jun. 22, 2018.
EPO, Office Action for EP Application No. 15855700, dated Jun. 21, 2018.

ROTORCRAFT AND ASSEMBLY AND DISASSEMBLY STRUCTURE FOR FOOT STAND AND AIRFRAME OF ROTORCRAFT

CROSS-REFERENCE TO RELATED APPLICATIONS

The present application is a continuation of International Patent Application No. PCT/CN2015/091753, filed Oct. 12, 2015, which claims the benefit of prior Chinese Applications No. 201420626211.1 filed Oct. 27, 2014, No. 201420631048.8 filed Oct. 27, 2014 and No. 201420631071.7 filed Oct. 27, 2014. The entire contents of the above-mentioned patent applications are incorporated by reference as part of the disclosure of this U.S. application.

FIELD

The present disclosure relates to a field of aircraft, specifically to a rotorcraft, and an assembly and disassembly structure for a foot stand and an airframe of the rotorcraft.

BACKGROUND

A rotorcraft is also called a rotor helicopter, which usually includes an airframe, an arm and a propeller. An end of the arm is connected with the airframe, and the propeller is mounted to the other end of the arm.

In order to support the rotorcraft and absorb shock when the rotorcraft lands, a foot stand is usually mounted beneath the airframe of the rotorcraft. When the rotorcraft takes off, the foot stand supports the airframe and makes the propeller on the airframe have a certain height distance from a ground, so that when the propeller rotates, a produced air flow can make the airframe rise up overcoming the gravity. The foot stand contacts the grounds when the rotorcraft lands, which has a function of shock absorption to buffer damage to the airframe. The foot stand of the rotorcraft in the prior art is usually fixed to the airframe by means of a bolt, which has a tedious assembly and disassembly process and cannot achieve a fast disassembly and assembly of the foot stand and is unfavorable for the maintenance and replacement of the foot stand.

SUMMARY

A rotorcraft and an assembly and disassembly structure for a foot stand and an airframe of the rotorcraft are provided in the embodiments of present disclosure.

In one aspect, the assembly and disassembly structure is applied to connect a foot stand with an airframe of the rotorcraft. The foot stand is disposed to a bottom of the airframe, the airframe has an accommodating groove disposed in a bottom wall thereof, a top wall of the accommodating groove is provided with a hole, and a side wall of the accommodating groove is provided with a clamping slot. The assembly and disassembly structure includes: a fixing stand fixedly connected to the foot stand and accommodated in the accommodating groove, in which the fixing stand is provided with an insert and the insert is fitted into the clamping slot; a plug pin movably mounted into the fixing stand, in which a portion of the plug pin passes through an upper surface of the fixing stand and forms an insertion end, and the insertion end matches the hole and is inserted into the hole; and an elastic component mounted in the fixing stand, connected to the plug pin, and configured to provide an elastic stress to push and press the plug pin so that the insertion end is embedded into the hole.

In an embodiment, the assembly and disassembly structure further includes a pushrod, the fixing stand is provided with a position limiting groove, an inside end of the pushrod is fitted over the plug pin, an outside end of the pushrod passes through the position limiting groove and extends out of the fixing stand, and the outside end of the pushrod drives the inside end of the pushrod when pressed to lead the plug pin move away from the hole.

In an embodiment, the plug pin is provided with a stop piece, and an inner side of the pushrod is fitted over the plug pin and located above the stop piece.

In an embodiment, the foot stand is provided with a connecting stand, the elastic component is limited between the connecting stand and the stop piece, and the fixing stand is in threaded connection with the connecting stand.

In an embodiment, the fixing stand is provided with a position limiting groove configured to limit an up-down movement of the pushrod.

In an embodiment, the fixing stand is provided with a fixing groove and the insert is configured to be a clamped piece located in the fixing groove and extending out of the fixing groove.

In another aspect, the present disclosure further provides a rotorcraft including a foot stand, an airframe and an assembly and disassembly structure. The foot stand is disposed to a bottom of the airframe, the airframe has an accommodating groove disposed in a bottom wall thereof, a top wall of the accommodating groove is provided with a hole, and a side wall of the accommodating groove is provided with a clamping slot. The assembly and disassembly structure includes: a fixing stand fixedly connected to the foot stand and accommodated in the accommodating groove, in which the fixing stand is provided with an insert and the insert is fitted into the clamping slot; a plug pin movably mounted into the fixing stand, in which a portion of the plug pin passes through an upper surface of the fixing stand and forms an insertion end, and the insertion end matches the hole and is inserted into the hole; and an elastic component mounted in the fixing stand, connected to the plug pin, and configured to provide an elastic stress to push and press the plug pin so that the insertion end is embedded into the hole.

Additional aspects and advantages of the present disclosure will be given in part in the following descriptions, become apparent in part from the following descriptions, or be learned from the practice of the present disclosure.

BRIEF DESCRIPTION OF THE DRAWINGS

These and other aspects and advantages of the present disclosure will become apparent and more readily appreciated from the following descriptions made with reference to the drawings, in which.

Figure 1:
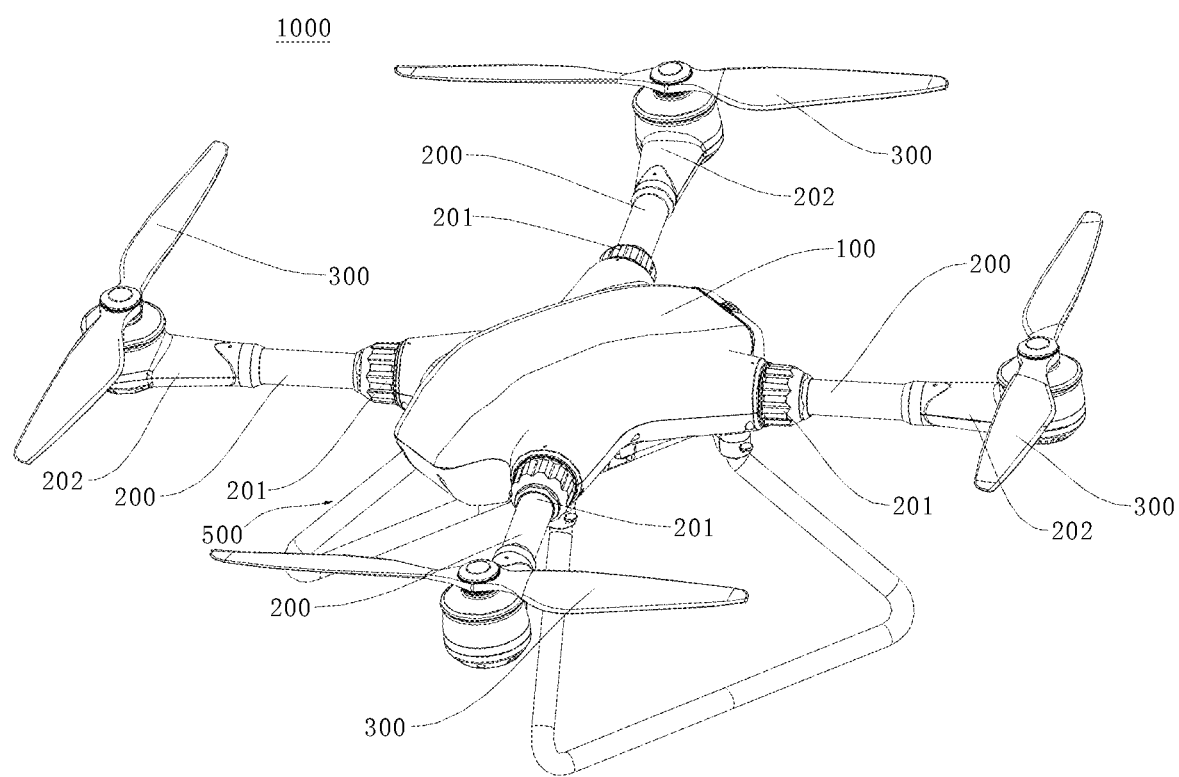
FIG. 1 is a schematic view of a rotorcraft according to an embodiment of the present disclosure.

REFERENCE NUMERALS rotorcraft 1000;

airframe 100; fixed sleeve pipe 11; a first external thread 111; boss 112; accommodating groove 12; top wall 121; hole 122; clamping slot 123;

arm 200; first end 201 of arm 200; second end 202 of arm 200; lock nut 21; lock sleeve 22; insertion portion 221; a second external thread 222; insertion head 23; fitting surface 231; protrusion portion 232; internal thread 233; extension portion 234; groove 235; first seal ring 24; second seal ring 25; flange 26;

propeller 300;

heat dissipation structure 400 for motor; casing 410; air inlet 411; air channel 412; head cover 430; air flow pick 431; water guiding surface 432; support 440; mounting stand 450;

foot stand 500; fixing stand 51; fixing groove 511; position limiting groove 512; insert 52; plug pin 53; stop piece 531; pushrod 54; elastic component 55; connecting stand 56;

motor 600.

DETAILED DESCRIPTION

Embodiments of the present disclosure will be described in detail in the following. Examples of the embodiments are shown in the drawings, and the same or similar elements and the elements having same or similar functions are denoted by like reference numerals throughout the descriptions. The embodiments described with reference to the drawings are illustrative, which is only used to explain the present disclosure and shouldn't be construed to limit the present disclosure.

In the specification, it should be understood that terms such as "axial direction", "circumferential direction", "up", "down", "front", "rear", "left", "right", "vertical", "horizontal", "top", "bottom", "inner", "outer" should be construed to refer to the orientation as then described or as shown in the drawings under discussion. These relative terms are for convenience of description and do not require that the present disclosure be constructed or operated in a particular orientation, so shall not be construed to limit the present disclosure. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, it should be noted that, unless specified or limited otherwise, the terms "mounted," "connected," "coupled," should be understood broadly, and may be, for example, fixed connections, detachable connections, or integral connections; may also be mechanical or electrical connections; may also be direct connections or indirect connections via intervening structures; may also be inner communications or interaction relationships of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A rotorcraft 1000 according to embodiments of the present disclosure will be described with reference to FIG. 1 to FIG. 10. As shown in FIG. 1, the rotorcraft 1000 according to embodiments of the present disclosure includes: an airframe 100, an arm 200 and a propeller 300.

A foot stand 500 may be disposed on a bottom of the airframe 100, the foot stand 500 performs a support function to the airframe 100 and a shock absorption function when the rotorcraft 1000 lands. As shown in FIG. 1, in an embodiment, a plurality of foot stands 500 may be disposed symmetrically on the bottom of the airframe 100, in an embodiment, one foot stand 500 may be disposed in a middle of the bottom of the airframe 100.

As shown in FIG. 1, a first end 201 (mounting end, root segment, front end) of the arm 200 is connected onto the airframe 100. As shown in FIG. 1, in an embodiment, a plurality of arms 200 such as four, eight or more arms may be provided. The plurality of arms 200 is arranged symmetrically with respect to the airframe 100. A second end 202 (free end, terminal end, rear end) of each arm 200 is provided with a corresponding propeller 300, and the corresponding propeller 300 is disposed on the arm 200 horizontally.

The propeller 300 is driven to rotate by a motor 600, a plurality of motors 600 may be provided, and the number of the motors 600 may be the same with that of the propellers 300. For example, each propeller 300 is driven to rotate by one motor 600. In an embodiment, a mounting location of each motor 600 corresponds with a location of a corresponding propeller 300. For example, each motor 600 may also be disposed at the second end 202 of the corresponding arm 200.

The rotorcraft 1000 according to embodiments of the present disclosure further includes a heat dissipation structure 400 for a motor, a connection structure of the arm 200 and the airframe 100, and a fast disassembly and assembly structure of the foot stand 500. The specific embodiments of each of the structures above will be illustrated in detail respectively in the following.

The heat dissipation structure 400 for the motor of the rotorcraft 1000 according to embodiments of the present disclosure will be described in the following with reference to FIG. 1 to FIG. 4. The heat dissipation structure 400 for the motor of the rotorcraft 1000 according to embodiments of the present disclosure includes: a casing 410, a head cover 430 and a mounting stand 450.

As shown in FIG. 1, the casing 410 is disposed to the second end 202 of each arm 200, in an embodiment, there may be provided with a fixed connection or a detachable connection between the casing 410 and the second end 202 of each arm 200. The casing 410 is a hollow structure having a top opening and an air inlet 411 in a bottom portion thereof. A motor body of each motor 600 is disposed inside of the casing 410, in an embodiment, the motor body of each motor 600 may be fixedly mounted with respect to the casing 410. That is, in a normal operation, the motor 600 is still with respect to the casing 410, making the motor 600 drive the propeller 300 stably. In an embodiment, the motor body of the motor 600 is detachably mounted with respect to the casing 410. In an embodiment, a revolving shaft of the motor 600 extends upwards and out of the casing 410, and an air channel 412 is formed between an edge of the motor body of the motor 600 and an inner wall of the casing 410.

Figure 2:
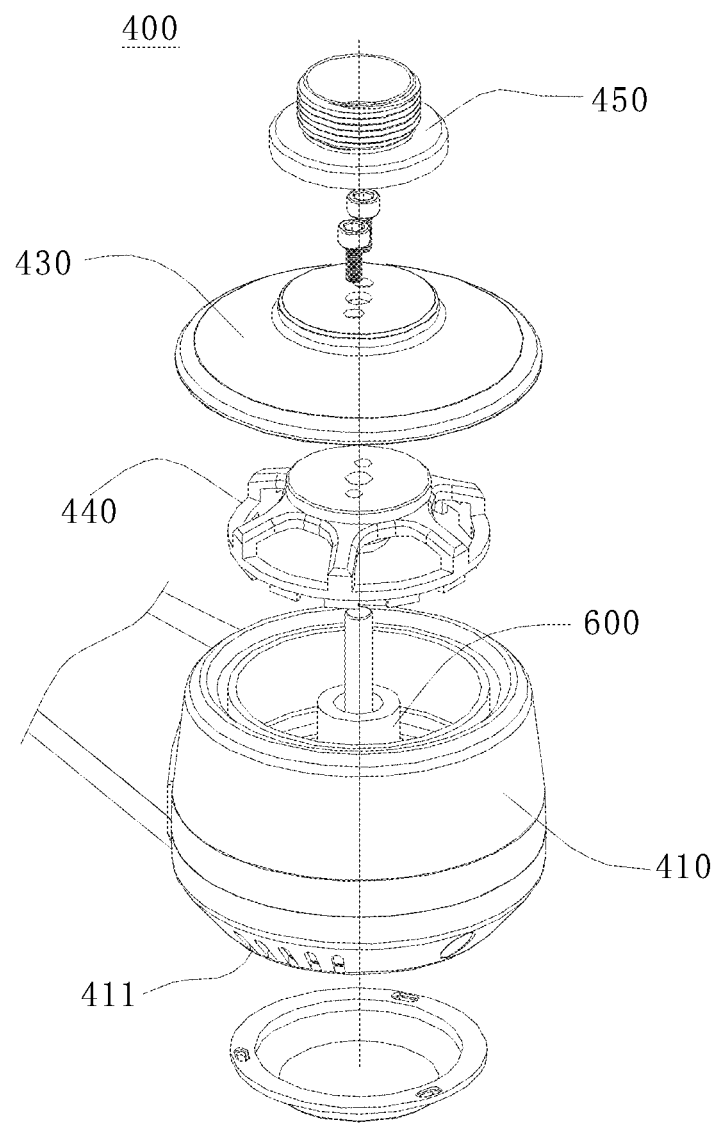
FIG. 2 is an exploded view of a heat dissipation structure for a motor of a rotorcraft according to an embodiment of the present disclosure.
Figure 3:
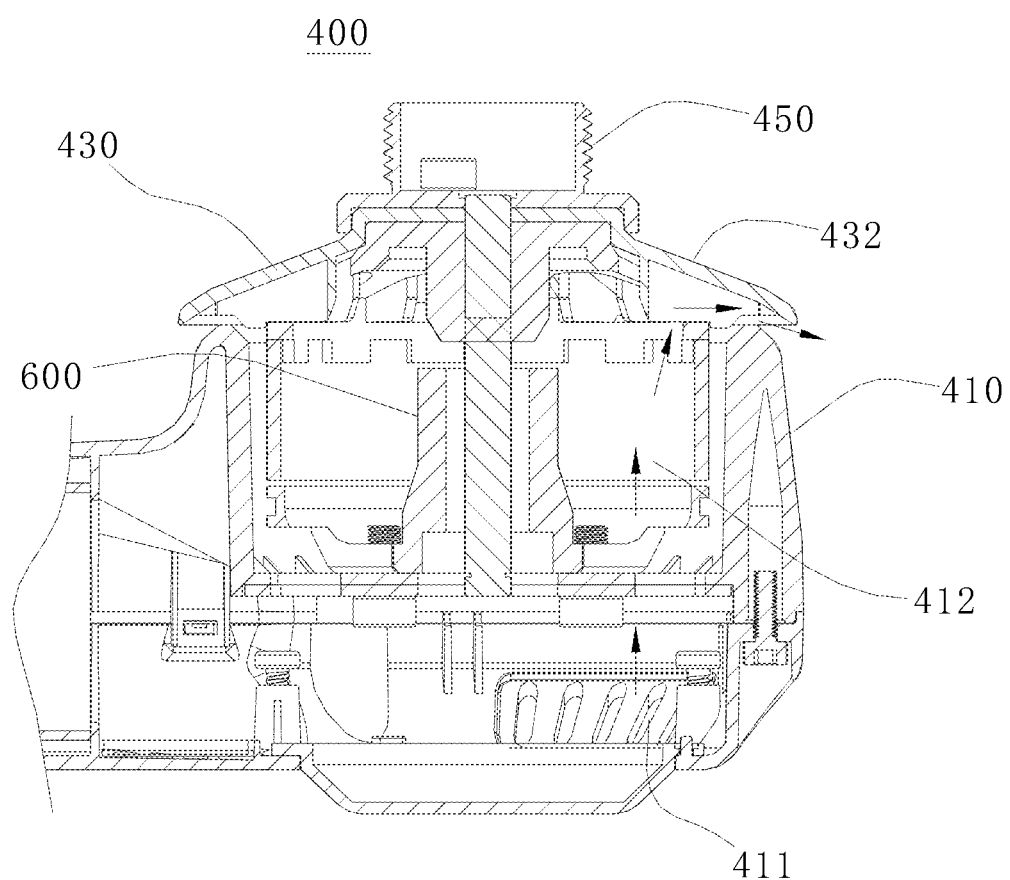
FIG. 3 is a section view of the heat dissipation structure for the motor shown in FIG. 2.
Figure 4:
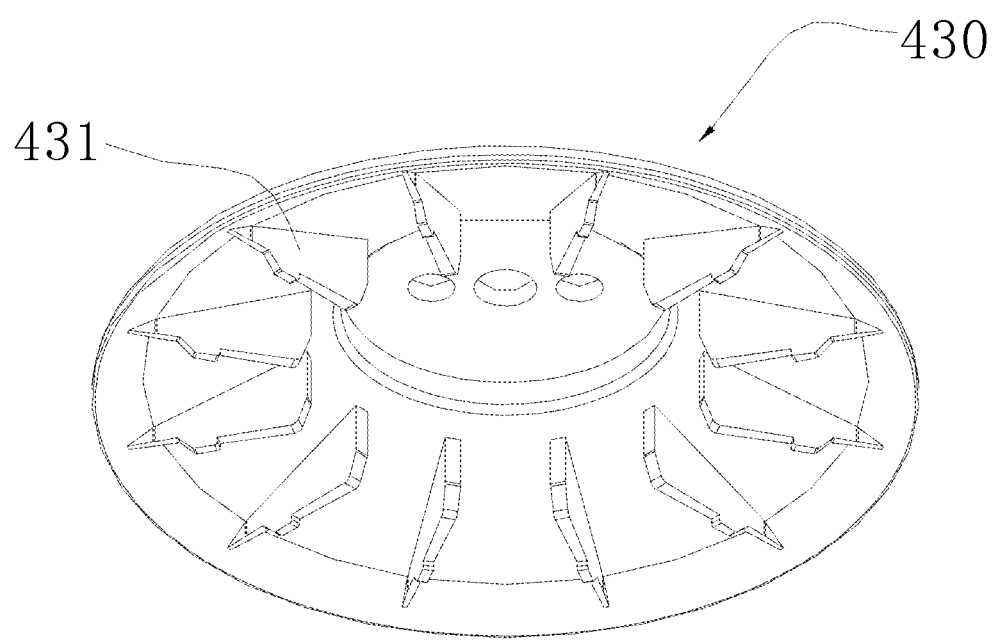
FIG. 4 is a schematic view of a head cover of the heat dissipation structure for the motor shown in FIG. 2.

In an embodiment, the air inlet 411 may be a small hole arranged in a bottom portion of a side wall of the casing 410, a plurality of small holes may be provided. As shown in FIG. 2, the small hole may be in the shape of any one such as a circle, a long circle, a polygon or an irregular shape, as long as the air outside can enter the air channel 412 in the casing 410 from the air inlet 411.

In an embodiment, the top opening of the casing 410 may be formed with an upper end, which is completely open, of the casing 410, or be formed with a top portion, which is open, of the air channel 412 in the casing 410.

The head cover 430 is connected to the revolving shaft of the motor 600 synchronously and covers the top opening in the above. A first gap communicating the air channel 412 with the outside is formed between a lower surface of the head cover 430 and a top end face of the casing 410. The first gap is formed between a lower surface of a circumferential edge of the head cover 430 and a top end face of the casing 410. A communication path is formed among the air inlet 411, the air channel 412 together with the first gap mentioned above and an outer environment. The lower surface of the head cover 430 is provided with a plurality of air flow picks 431.

The mounting stand 450 is fixed to an upper surface of the head cover 430 and configured to be connected with the propeller 300. In an embodiment, the mounting stand 450 and the propeller 300 can be mounted in any form, such as being connected in thread, being connected with snap, being connected by welding and etc., thus the propeller 300 is fixed to the mounting stand 450. With the motor 600 driving the head cover 430 to rotate, the head cover 430 further drives the propeller 300 to rotate.

In other words, the casing 410 is fixed to an end of each arm 200 of the rotorcraft 1000 and is the hollow structure having the top opening and the air inlet 411 in the bottom portion. The air inlet 411 may be the small hole arranged in the bottom portion of the side wall of the casing 410, and the plurality of small holes may be provided. The motor body of the motor 600 is mounted inside of the casing 410, and the air channel 412 is formed between the circumferential edge of the motor body of the motor 600 and the inner wall of the casing 410. The head cover 430 is connected to the revolving shaft of the motor 600 synchronously and is located above the casing 410 i.e. covers the top opening in the above. The first gap is formed between the lower surface of the circumferential edge of the head cover 430 and the top end face of the casing 410 and communicates an upper end portion of the air channel 412 with the outside. Thus, the communication path is formed among the air inlet 411, the air channel 412 together with the first gap mentioned above and the outer environment, and the lower surface of the head cover 430 is provided with the plurality of air flow picks 431. The mounting stand 450 is fixed to the upper surface of the head cover 430, and an external thread used to fix the propeller 300 and the mounting stand 450 may be provided on the mounting stand 450 so as to make the revolving shaft of the motor 600 drive the propeller 300 to rotate.

When the motor 600 operates, the revolving shaft thereof drives the head cover 430 to rotate, the plurality of air flow picks 431 disposed on the lower surface the head cover 430 stir the air inside of the casing 410 to flow. Under a function of a centrifugal force, a negative pressure is formed in the upper portion of the casing 410, and the air flows from the bottom up in the air channel 412. Air at a low temperature in the outer environment enters the air channel 412 through the air inlet 411, exchanges heat with the motor body of the motor 600 at a high temperature to take out the heat, and flows out along the first gap between the head cover 430 and the top end face of the casing 410.

The plurality of air flow picks 431 mentioned above are arranged in a circumferential array around a central axis of the head cover 430, and an extension direction of each of the air flow picks 431 is coincident with a radial direction of the head cover 430. In an embodiment, each of the air flow picks 431 may be triangular in shape, and a distance between a top end face and a bottom end face of each of the air flow picks 431 decreases gradually from the inside out (that means from one end to another end).

The plurality of air flow picks 431 may also be arranged to be spiral in shape, and an included angle may be formed between the extension direction of each of the air flow picks 431 and the radial direction of the head cover 430. In conclusion, the distribution of the air flow picks 431 arranged on the head cover 430 and the shape of each air flow pick 431 are configured to make the air flow picks 431 stir the air in the casing 410 to flow outside, generating the negative pressure in the upper portion of the casing 410, when the head cover 430 rotates.

In short, no matter how the air flow picks 431 are arranged on the head cover 430 or what shape the air flow picks 431 have, as long as the plurality of air flow picks can stir the air in the casing 410 and make the air flow outwards to generate the negative pressure in the upper portion of the casing 410 when the head cover 430 rotates.

In an embodiment, a second gap exists between an inner end (i.e. an end of each of the air flow picks 431 adjacent to a center of the head cover 430) of each of the air flow picks 431 and a center of the head cover. Thus, a spaced area located in the center of the head cover 430 is defined and surrounded by the inner ends of the plurality of air flow picks 431, and the negative pressure can be formed in the spaced area when the head cover 430 rotates along with the revolving shaft of the motor 600. The air pressure of the sucked air is lower than that of the air in an interspace between an inner wall of the casing 410 and the motor 600, thus the hot air in the motor enters the negative-pressure area surrounded by the inner ends of the plurality of air flow picks 431 under a function of the air pressure difference and then is exhausted from the air channel 412 at a high speed, playing a role of heat dissipation for the motor.

In an embodiment, the upper surface of the head cover 430 mentioned above may be provided with a water guiding surface 432, and the water guiding surface 432 has a height gradually reducing from a center to an edge. A diameter of the head cover 430 is larger than a diameter of the top portion of the casing 410, that is, the edge of the head cover 430 is located outside of the top edge of the casing 410. The rainwater flows downwards along the water guiding surface 432 and does not enter the casing 410 from the first gap formed between the head cover 430 and the top end face of the casing 410.

In an embodiment, the revolving shaft of the motor 600 is provided with a support 440, the head cover 430 and the mounting stand 450 are fixed to the support 440 through a bolt.

A connecting structure for the arm 200 and the airframe 100 of the rotorcraft 1000 according to embodiments of the present disclosure will be described in the following with reference to FIG. 1, FIGS. 5-7. Referring to an example shown in FIG. 1, in the example, the rotorcraft 1000 includes four arms 200, and the rotorcraft 1000 having four arms 200 will be taken as an example to be described in the following. The connecting structure for the arm 200 and the airframe 100 of the rotorcraft 1000 according to embodiments of the present disclosure includes: a fixed sleeve pipe 11, an insertion head 23, a lock sleeve 22 and a lock nut 21.

Figure 5:
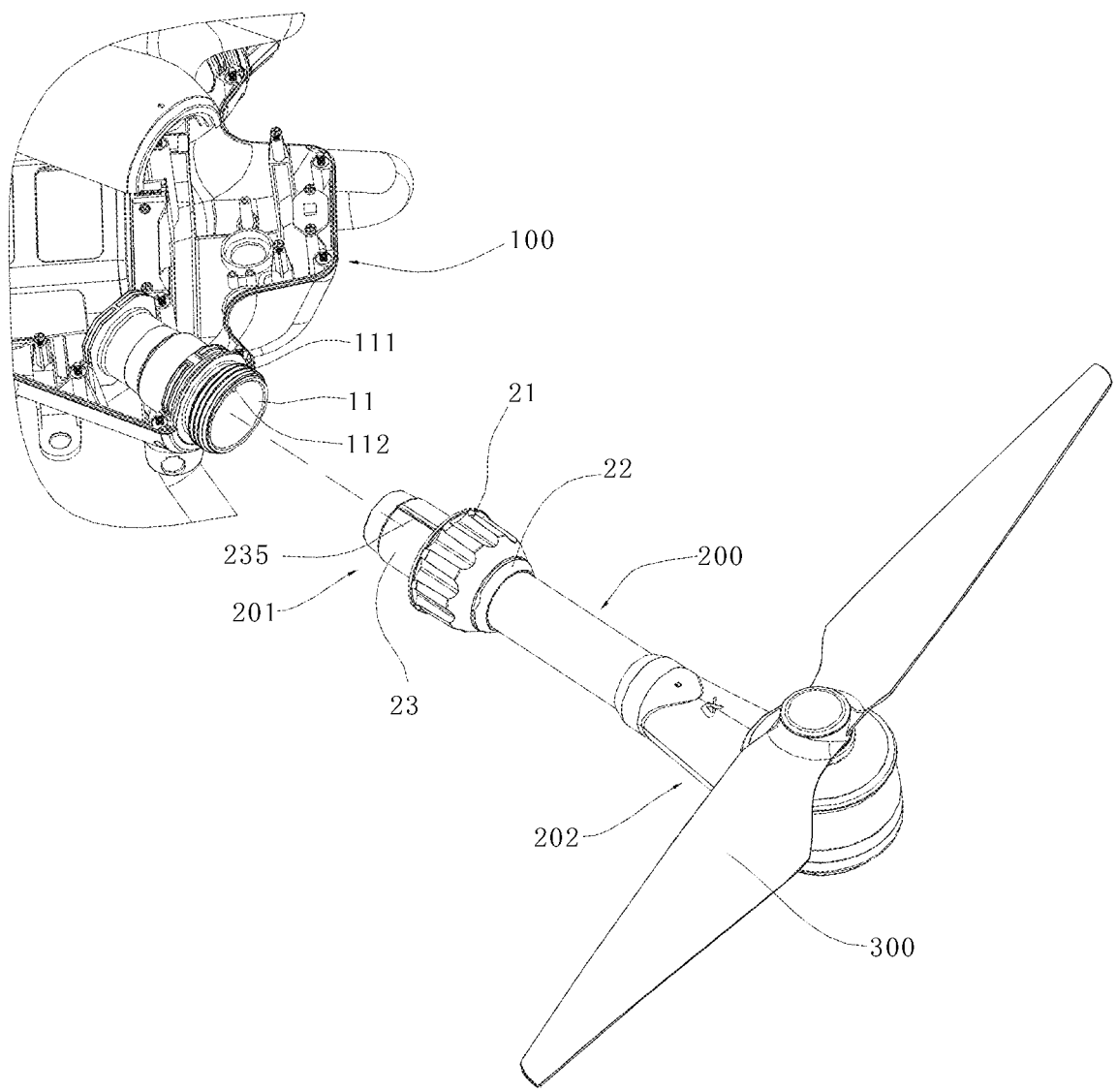
FIG. 5 is a schematic view of a connecting structure for an arm and an airframe of a rotorcraft according to an embodiment of the present disclosure.
Figure 6:
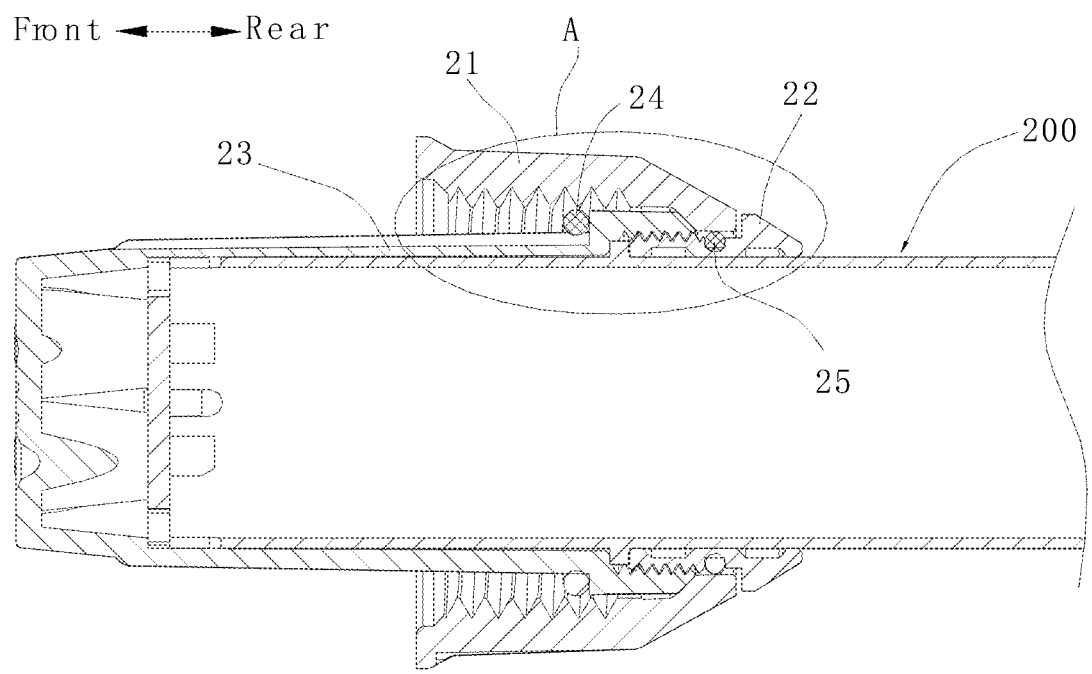
FIG. 6 is a section view of the connecting structure for the arm and the airframe shown in FIG. 5.
Figure 7:
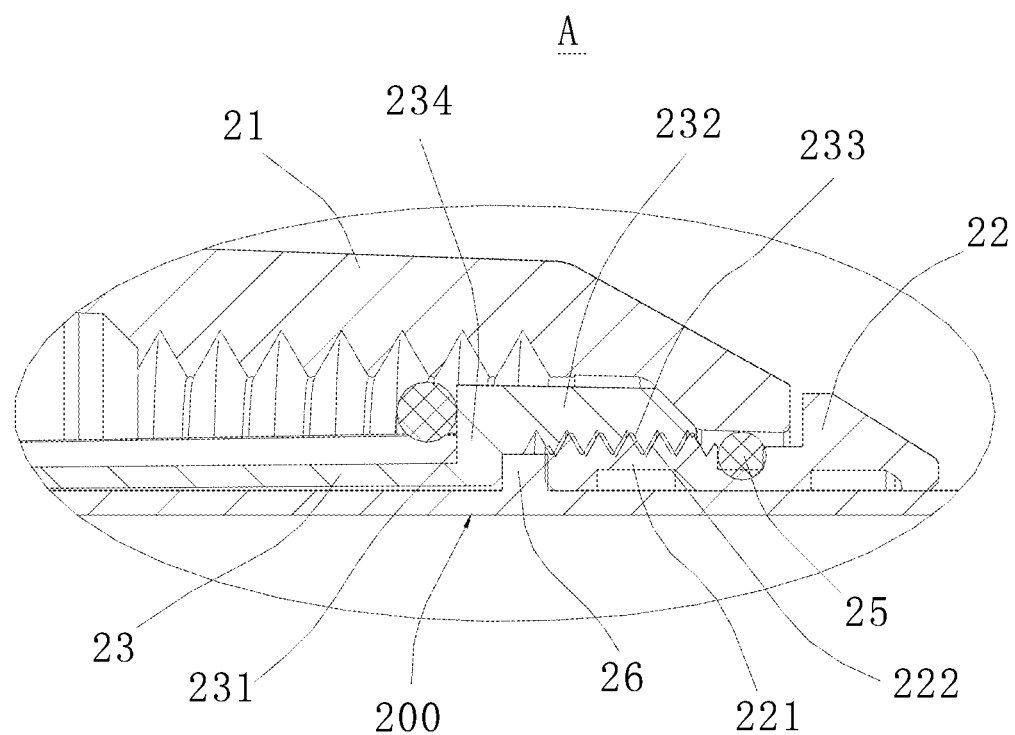
FIG. 7 is an enlarged view of portion A shown in FIG. 6.

As shown in FIG. 1 and FIG. 5, the fixed sleeve pipe 11 extends out from a circumferential edge of the airframe 100, and four fixed sleeve pipes 11 extend out from the circumferential edge of the airframe 100 and are mounted with the four arms 200 respectively. As shown in FIG. 5 and FIG. 6, the insertion head 23 is disposed at the first end 201 (an end of the arm 200 adjacent to the airframe 100, a front end) of each arm 200 and configured to be inserted into the fixed sleeve pipe 11. Specifically, the insertion head 23 is fitted over the first end 201 of the arm 200 in a direction from the first end 201 to the second end 202 of the arm 200, that is, as shown in FIG. 5 and FIG. 6, the insertion head 23 is fitted over the first end 201 of the arm 200 from front to rear.

The insertion head 23 is provided with a protrusion portion 232 protruding from an outer surface of each arm 200, and an insertion groove is formed between the protrusion portion 232 and the outer surface of the arm 200. As shown in FIG. 5 and FIG. 6, the protrusion portion 232 may be located at a second end (a rear end) of the insertion head 23, a third gap is defined between the protrusion portion 232 and the outer surface of the arm 200, and the third gap is formed to be the insertion groove. As shown in FIG. 5 and FIG. 6, an opening of the insertion groove faces the rear. The lock sleeve 22 is fitted over the arm 200 and has an insertion portion 221 embedded into the insertion groove. Specifically, as shown in FIG. 5 and FIG. 6, the insertion portion 221 is located in front of the lock sleeve 22 and is inserted into the insertion groove forward.

In an embodiment, the insertion head 23 is fitted over the first end 201 of the arm 200 in a detachable manner, for example, the insertion head 23 may be mounted to the first end 201 of the arm 200 through threaded connection, or a snap structure.

The insertion portion 221 may be in threaded connection with the protrusion portion 232. The tightness between the insertion head 23 and the lock sleeve 22 can be adjusted according to demands.

The lock nut 21 is fitted over the arm 200, and a second end (a rear end) of the lock nut 21 has a tensing end abutting against a second end surface (a rear end surface) of the protrusion portion 232. The lock nut 21 is in threaded connection with the fixed sleeve pipe 11. When the insertion head 23 is mounted stably to the arm 200, a position of the protrusion portion 232 relative to the arm 200 is fixed.

Specifically, as shown in FIG. 5, a first external thread 111 is formed on an outer surface of the fixed sleeve pipe 11 and the lock nut 21 is in threaded connection with the first external thread 111. A second external thread 222, in threaded connection with an inner surface of the protrusion portion 232, is formed on an outer surface of the insertion portion 221, which can achieve the threaded connection between the insertion portion 221 and the protrusion portion 232.

In an embodiment, as shown in FIG. 5 and FIG. 6, a fitting surface is formed at a first end (the front end) of the protrusion portion 232, and a first seal ring 24 is clamped between an outer end face (the free end face) of the fixed sleeve pipe 11 and the fitting surface 231. Specifically, the first seal ring 24 is fitted over the outer surface of the insertion head 23, thus the insertion head 23 is ensured to be locked tightly with the fixed sleeve pipe 11. In an embodiment, the insertion head 23 is provided with an extension portion 234 extending outwards in a radial direction thereof, and the protrusion portion 232 extends from an edge of the extension portion 234 and extends towards the second end 202 of the arm 200, and the fitting surface 231 can be a first end face of the extension portion 234.

In an embodiment, a second seal ring 25 is fitted over the lock sleeve 22 and is clamped between an outer surface of the lock sleeve 22 and an inner surface of the second end (the rear end) of the lock nut 21.

In other words, as shown in FIG. 1 and FIGS. 5 to 7, the airframe 100 is provided with the fixed sleeve pipes 11, and the arm 200 is provided with the insertion head 23, the lock nut 21 and the lock sleeve 22. The fixed sleeve pipe 11 extends out from the circumferential edge of the airframe 100 and is provided with the first external thread 111 on the outer surface thereof. The fixed sleeve pipe 11 can be fixed in the airframe 100 in a detachable manner, for example, the airframe 100 is designed to have an upper housing and an lower housing which are fastened with each other, the fixed sleeve pipe 11 is pre-embedded in a semi-circular groove of the lower housing, and a degree of freedom of the fixed sleeve pipe 11 along an axial direction thereof is limited by a position limiting structure, and then the upper housing is fastened to fix the upper housing and the lower housing, thus fixing the fixed sleeve pipe 11 and the airframe 100. In an embodiment, the fixed sleeve pipe 11 and the airframe 100 may also be fixed with other structures which are well known by people who is skilled in the related art and will not be described in detail here.

The insertion head 23 mentioned above is fitted over the front end of the arm 200 and is provided with the protrusion portion 232 protruding from the outer surface of the arm 200, and the insertion groove is formed between the protrusion portion 232 and the outer surface of the arm 200. The insertion head may be provided with the extension portion 234 extending outwards in the radial direction and the protrusion portion 232 extends from the extension portion extending 234 backwards, and the fitting surface 231 in the radial direction is formed in the front end face of the extension portion 234 and is fitted with the end face of the fixed sleeve pipe 11. The first seal ring 24 located between the fitting surface 231 and the end face of the fixed sleeve pipe 11 is sleeved over the insertion head 23. The lock nut 21 and the lock sleeve 22 are both fitted over the arm 200, the lock nut 21 is in threaded connection with the first external thread 111, and the rear end of the lock nut 21 has the tensing end abutting against the rear end face of the protrusion portion 232. When the lock nut 21 is screwed, the tensing end in the rear end face thereof can push the insertion head 23 towards the fixed sleeve pipe 11 and make the fitting surface 231 and the end face of the fixed sleeve pipe 11 clamp the first seal ring 24. The lock sleeve 22 has the insertion portion 221 embedded into the insertion groove, and the second external thread 222 is formed on the outer surface of the insertion portion 221. An internal thread 233 is provided in the inner surface of the protrusion portion 232 corresponding to the second external thread 222. In addition, the second seal ring 25 is fitted over the lock sleeve 22 and is clamped between the outer surface of the lock sleeve 22 and the inner surface of the rear end of the lock nut 21. A surface of the arm 200 is provided with a flange 26 and the flange 26 is clamped between the extension portion 234 and the front end face of the insertion portion 221.

During the installation, the lock sleeve 22, the lock nut 21 and the insertion head 23 are fitted over the front end of the arm 200, then the insertion head 23 is inserted into the fixed sleeve pipe 11, the lock sleeve 22 is screwed, and the insertion head 23 and the lock sleeve 22 are locked by means of the second external thread 222 and the internal thread 233. That is, the flange 26 is clamped between the extension portion 234 and the insertion portion 221, and then the lock nut 21 is screwed to make the fitting surface 231 and the end face of the fixed sleeve pipe 11 clamp the first seal ring 24 ensuring that the insertion head 23 and the fixed sleeve pipe 11 are locked. When the lock nut 21 is screwed, the rear end thereof presses the second seal ring 25. Then the assembly of the arm 200 and the airframe 100 is finished. Threaded connection of the structure mentioned above results the fast disassembly and assembly of the arm 200 and the airframe 100, and meanwhile, the first seal ring 24 and the second seal ring 25 can be pressed in the thread locking manner, which ensures a seal function of the connection between the airframe 100 and the arm 200. In addition, during the process of screwing the lock nut 21, the second seal ring 25 can provide certain preload to the lock nut 21 and ensure a connection security between the lock nut 21 and the fixed sleeve pipe 11.

In an embodiment, connection pieces configured to turn on a circuit are disposed in the fixed sleeve pipe 11 and the insertion head 23 respectively. When the arm 200 and the airframe 100 are assembled, the connection piece in the fixed sleeve pipe 11 and the connection piece in the insertion head 23 are in contact with each other, and the circuit is turned on. The circuit may be a power supply circuit and/or a control circuit of the motor 600 and the propeller 300.

The connection pieces in the fixed sleeve pipe 11 and the insertion head 23 can be any structure, as long as the circuit can be turned on when the two connection pieces are in contact. For example, metal sheets may be disposed in the fixed sleeve pipe 11 and the insertion head 23 respectively and the purpose of turning on the circuit can be satisfied when the two metal sheet are in contact. In an embodiment, the fixed sleeve pipe 11 is provided with a female plug therein and the insertion head 23 is provided with a male plug capable of inserting into the female plug.

An outer surface of the insertion head 23 is provided with a groove 235 extending in an axial direction, and an inner wall of the fixed sleeve pipe 11 is provided with a boss 112 capable of being embedded into the groove 235. In an embodiment, the outer surface of the insertion head 23 mentioned is provided with the groove 235 extending in the axial direction, and the inner wall of the fixed sleeve pipe 11 is provided with the boss 112 capable of being embedded into the groove 235. During the insertion and installation, the boss 112 is embedded into the groove 235, which can guide the installation of the arm 200 and the fixed sleeve pipe 11. Furthermore, a plurality of grooves 235 may be provided in different positions in the insertion heads 23 of the arms 200 of the rotorcraft 1000, the fixed sleeve pipes 11 corresponding to the arms 200 are provided with bosses 112 corresponding to the grooves 235 in different positions.

The arm 200 and the airframe 100 are locked and fixed by means of the lock nut 21 and the lock sleeve 22 in the present disclosure, and the seal ring is pressed in a thread fasten manner.

A fast assembly and disassembly structure of a foot stand 500 of a rotorcraft 1000 according to embodiments of the present disclosure will be described with reference to FIG. 1 and FIGS. 8-10. Referring to the example shown in FIG. 1, in the example, the rotorcraft 1000 includes two foot stands 500, and the two foot stands 500 are arranged at the bottom of the airframe 100 symmetrically with respect to a center line of the airframe 100. Each of the foot stands 500 has two connecting ends for the airframe 100, and, each connecting end of each of the foot stands 500 is provided with the fast assembly and disassembly structure according to embodiments of the present disclosure. As shown in FIG. 1 and FIGS. 8-10, the fast assembly and disassembly structure of the foot stand 500 of the rotorcraft 1000 according to embodiments of the present disclosure includes: an accommodating groove 12 disposed in a bottom wall of an airframe 100 and having a downward opening, a fixing stand 51, a plug pin 53, an elastic component 55 and a pushrod 54.

Figure 8:
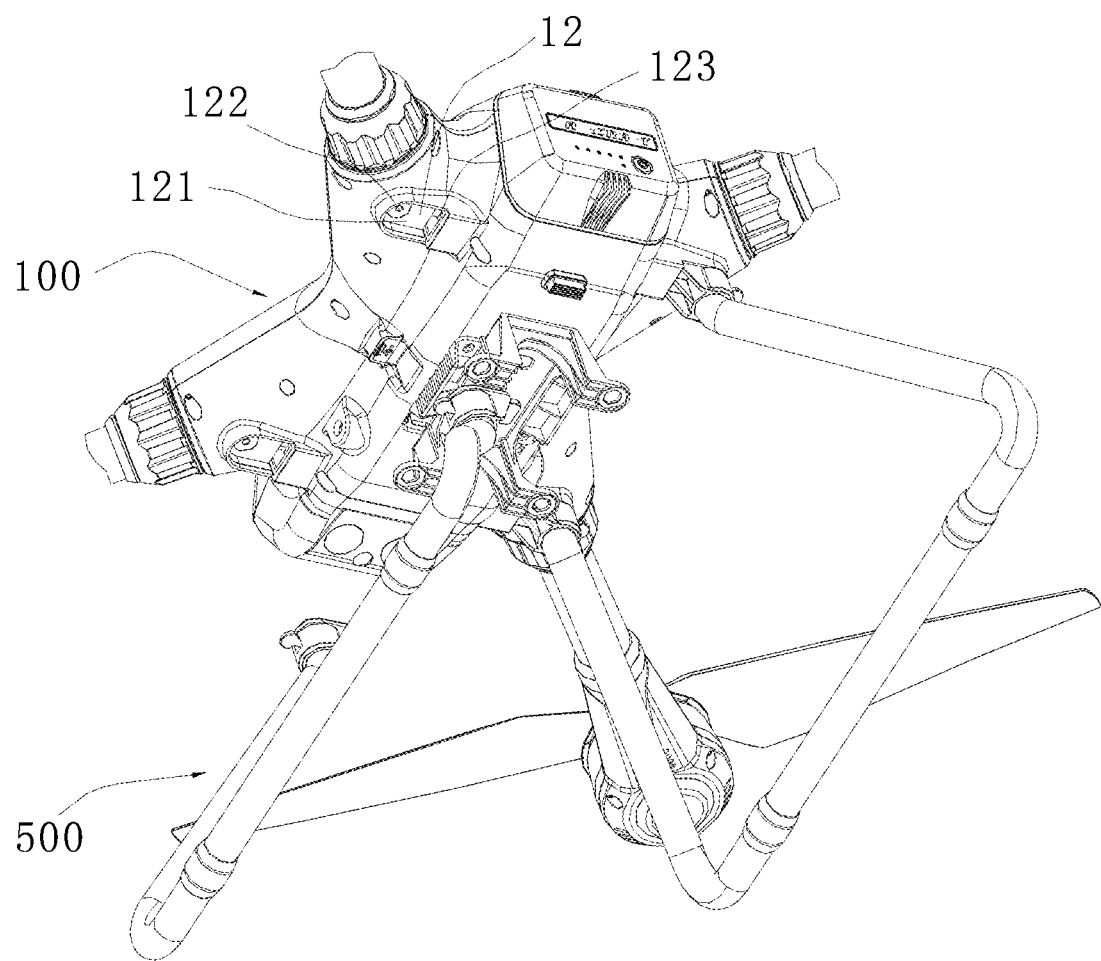
FIG. 8 is a schematic view of an assembly and disassembly structure for a foot stand of a rotorcraft according to an embodiment of the present disclosure.
Figure 9:
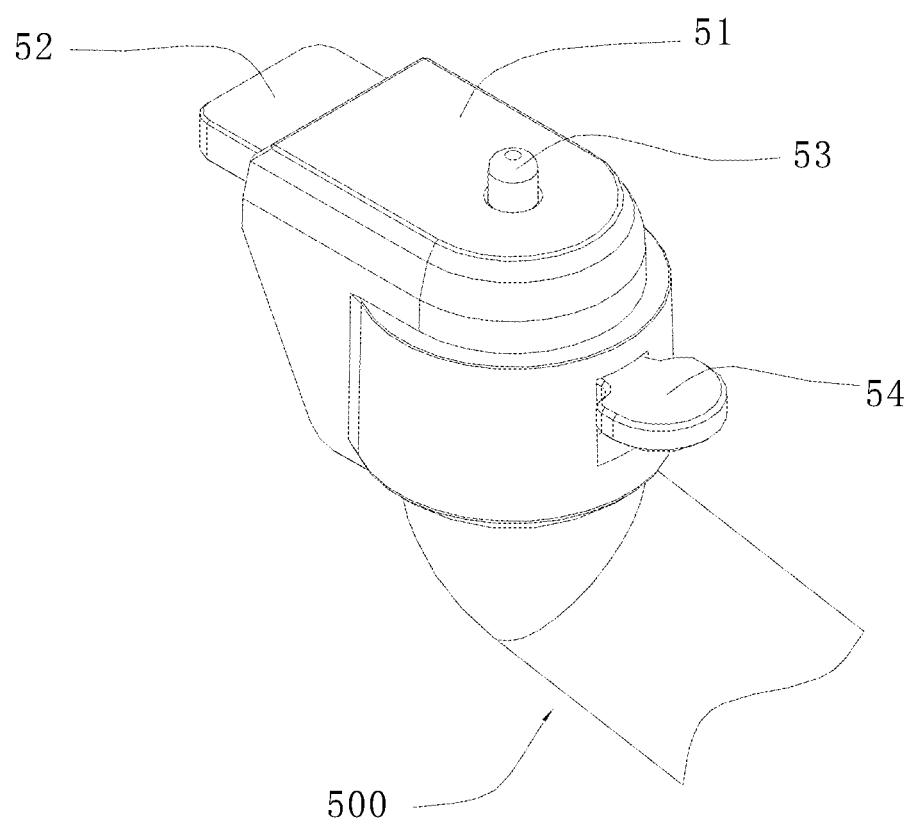
FIG. 9 is a schematic view of the foot stand according to the assembly and disassembly structure for the foot stand in assembly shown in FIG. 8.

As shown in FIG. 8, a top wall 121 of the accommodating groove 12 is provided with a hole 122, the fixing stand 51 is fixedly connected to each foot stand 500 and accommodated in the accommodating groove 12, and the plug pin is movably mounted into the fixing stand 51. Specifically, the plug pin 53 can move in an up-down direction, a portion of the plug pin 53 passing through an upper surface of the fixing stand 51 is provided with an insertion end, and the insertion end matches the hole 122 and is inserted into the hole 122. Further, a side wall of the accommodating groove 12 is provided with a clamping slot 123, the fixing stand 51 is provided with an insert 52, and the insert 52 is fitted into the clamping slot 123. When the insert 52 is fitted into the clamping slot 123 and the plug pin 53 is inserted into the hole 122, the fixing stand 51 is fixed into the accommodating groove 12, thus achieving a purpose of disposing the foot stand 500 to the airframe 100.

Further, the elastic component 55 is configured to provide an elastic stress to push and press the plug pin 53 so that the insertion end is embedded into the hole 122, i.e. the elastic component 55 is configured to be in a pressed state, by which the plug pin 53 can be pushed and pressed. The pushrod 54 leads the plug pin 53 to move far away from the hole 122 when pressed, so when the foot stand 500 needs to be disassembled, the pushrod 54 may be pressed so as to disengage the plug pin 53 from the hole 122, and the fixing stand 51 is rotated downwards taking the insert 52 as a fulcrum so that the insert 52 is disengaged from the clamping slot 123 and further the foot stand 500 is disassembled from the airframe 100. During the installation process, the insert 52 is inserted into the clamping slot 123 and then the fixing stand 51 is pushed upwards taking the insert 52 as the fulcrum, and when the fixing stand 51 is fitted into the accommodating groove 12, the insertion end is embedded into the hole 122 by the elastic component 55, thus complete the installation.

In an embodiment, the fixing stand 51 is provided with a fixing groove 511, and the insert 52 is configured to be a clamped piece extending out of the fixing groove 511. The fixing stand 51 is provided with a position limiting groove 512 configured to limit an up-down movement of the pushrod 54, thus limiting and positioning the movement of the pushrod 54.

Figure 10:
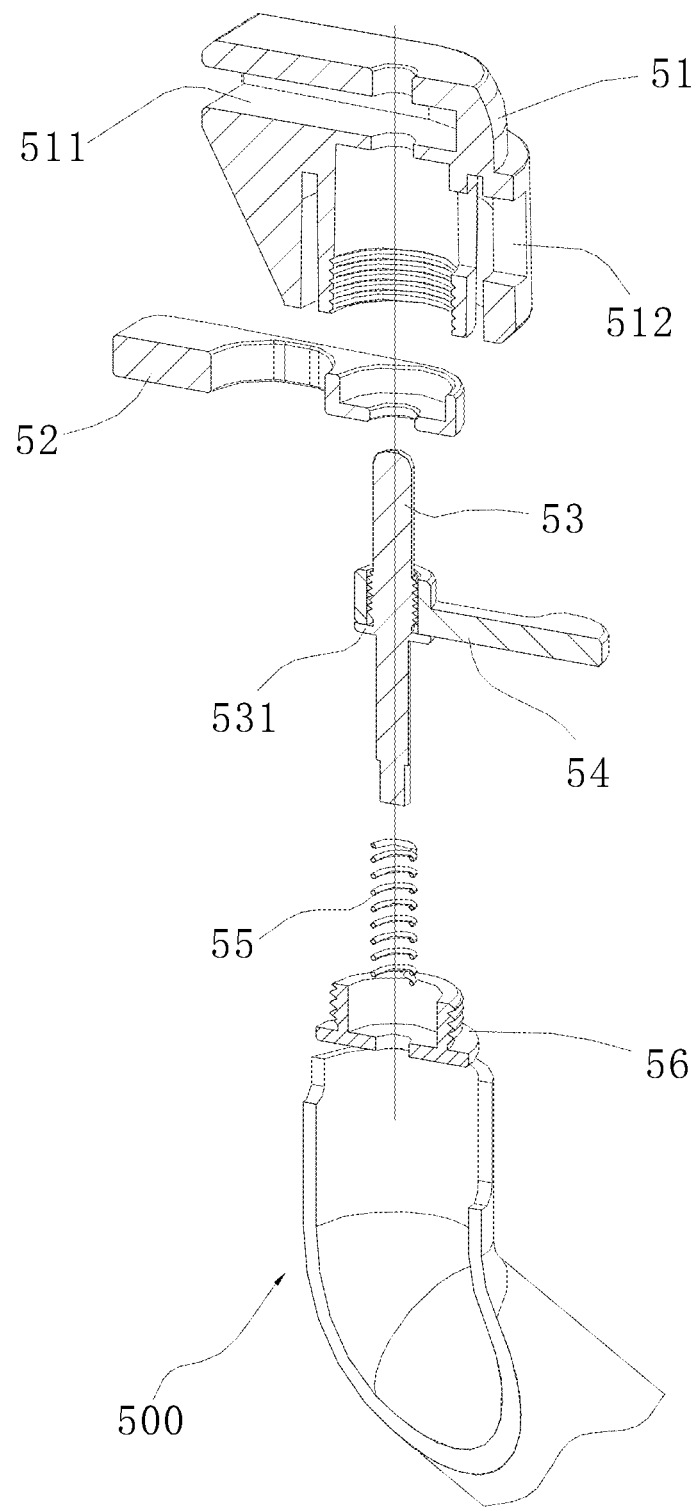
FIG. 10 is a sectionally schematic view of the foot stand according to the assembly and disassembly structure for the foot stand in disassembly shown in FIG. 8.

As shown in FIG. 10, in an embodiment, the plug pin 53 is provided with a stop piece 531 and the pushrod 54 is fitted over the plug pin 53 and located above the stop piece 531, thus pushing the plug pin 53 to move downwards by means of the pushrod 54.

In other words, for the fast assembly and disassembly structure of the foot stand 500 of the rotorcraft 1000 according to the present disclosure, the accommodating groove 12 having a downward opening is disposed in the bottom wall of the airframe 100, and the fixing stand 51 is fixedly connected to a top end of the foot stand 500. The top wall 121 of the accommodating groove 12 is provided with the hole 122, and one side wall of the accommodating groove 12 is provided with the clamping slot 123. The fixing stand 51 has a shape corresponding with that of the accommodating groove 12 and is accommodated into the accommodating groove 12. One side of the fixing stand 51 is provided with the clamped piece, and the clamped piece is inserted into the clamping slot 123 when the fixing stand 51 is accommodated in the accommodating groove 12. The fixing stand 51 can be a hollow structure, and the plug pin 53 capable of moving upward and downward is disposed therein, the extension direction of the plug pin 53 is coincident with the height direction thereof, an upper end portion of the plug pin 53 extends through the upper surface of the fixing stand 51, and the exposed portion forms the insertion end matching the hole 122 and inserted into the hole 122. A spring is fitted over the plug pin 53 and used to provide the elastic stress to push and press the plug pin 53 upwards so that the insertion end on the top of the plug pin 53 is inserted into the hole 122. Specifically, the spring may be clamped between the bottom of the fixing stand 51 and the plug pin 53, or between the foot stand 500 and the plug pin 53, as long as a lower portion of the spring is supported and an upper portion of the spring presses and pushes the plug pin 53. Certainly, in order to ensure the upper portion of the spring to press and push the plug pin 53 upwards, the plug pin 53 may be provided with the stop piece 531 pushing and pressing the upper portion of the spring, that is, the spring is limited between the stop piece 531 and the bottom of the fixing stand 51 or between the stop piece 531 and the foot stand 500. It should be noted that, the spring which provides the elastic stress for pushing the plug pin 53 may be other elastic components such as an elastic rubber block. The plug pin 53 is further connected with the pushrod 54, and the pushrod 54 leads the plug pin 53 to move downwards when pressed downwards, which can make the insertion end on the top of the plug pin 53 separated from the hole 122. Specifically, an inside end of the pushrod 54 is fitted over the plug pin 53 and located on the stop piece 531, and an outside end of the pushrod 54 passes through the position limiting groove 512 disposed in the fixing stand 51 and extends out of the fixing stand 51. The position limiting groove 512 is used to limit the up-down movement of the pushrod 54 and guide the up-down movement of the pushrod 54.

When the fast assembly and disassembly structure in the present disclosure is disassembled, the outside end of the pushrod 54 is pushed downwards, and the pushrod 54 leads the plug pin 53 to move downwards, the insertion end on the top of the plug pin 53 is separated from the hole 122, the foot stand 500 rotates taking the clamped piece as the fulcrum and makes the fixing stand 51 separated from the accommodating groove 12, thus detaching the foot stand 500 from the airframe 100 quickly. During the installation, the clamped piece is inserted into the clamping slot 123, and the foot stand 500 is rotated taking the clamped piece as the fulcrum, and when the upper surface of the fixing stand 51 is attached to the top wall 121 of the accommodating groove 12, the insertion end of the top of the plug pin 53 is inserted into the hole 122, the plug pin 53 is engaged with the hole 122 under a function of the elastic stress of the spring, thus fixing the foot stand 500 to the bottom of the airframe 100.

The clamped piece mentioned above may be formed integrally with or separately from the fixing stand 51, specifically, the fixing stand 51 is provided with the fixing groove 511 and the clamped piece is fixed in the fixing groove 511 and extends out of the fixing groove 511. The clamped piece may be an aluminum sheet or other inserts 52 that can be embedded inside of the clamping slot 123.

The foot stand 500 is provided with a connecting stand 56, the spring is limited between the connecting stand 56 and the stop piece 531, an outer circumferential edge of the connecting stand 56 is provided with an external thread and the fixing stand 51 is provided with an internal thread matched with the external thread so that the fixing stand 51 is in threaded connection with the foot stand 500.

Reference throughout this specification to "an embodiment," "some embodiments," "illustrative embodiment", "an example," "a specific example," or "some examples," means that a particular feature, structure, material, or characteristic described in connection with the embodiment or example is included in at least one embodiment or example of the present disclosure. In the present specification, the illustrative statement of the terms above is not necessarily referring to the same embodiment or example. Furthermore, the particular features, structures, materials, or characteristics may be combined in any suitable manner in one or more embodiments or examples.

Although embodiments of the present disclosure have been shown and described, it would be appreciated by those skilled in the art that changes, alternatives, variation and modifications can be made in the embodiments within the scope the present disclosure, and the scope of the present disclosure is limited by the claims and its equivalents.

What is claimed is:

1. An assembly and disassembly structure for a foot stand and an airframe of a rotorcraft, wherein the foot stand is disposed to a bottom of the airframe, the assembly and disassembly structure comprising:
   an accommodating groove disposed in a bottom wall of the airframe, wherein a top wall of the accommodating groove is provided with a hole, and a side wall of the accommodating groove is provided with a clamping slot;
   a fixing stand configured to be fixedly connected to the foot stand and accommodated in the accommodating groove, wherein the fixing stand is provided with an insert and the insert is configured to be fitted into the clamping slot;
   a plug pin movably mounted into the fixing stand, wherein a portion of the plug pin passes through an upper surface of the fixing stand and forms an insertion end, and the insertion end matches the hole and is inserted into the hole; and
   an elastic component mounted in the fixing stand, connected to the plug pin, and configured to provide an elastic stress to push and press the plug pin so that the insertion end is embedded into the hole.

2. The assembly and disassembly structure according to claim 1 further comprising a pushrod, wherein the fixing stand is provided with a position limiting groove, an inside end of the pushrod is fitted over the plug pin, an outside end of the pushrod passes through the position limiting groove and extends out of the fixing stand, and the outside end of the pushrod drives the inside end of the pushrod when pressed to lead the plug pin move away from the hole.

3. The assembly and disassembly structure according to claim 2, wherein the plug pin is provided with a stop piece, and the pushrod is fitted over the plug pin and located above the stop piece.

4. The assembly and disassembly structure according to claim 3, wherein the elastic component is disposed between the stop piece and a bottom of the fixing stand.

5. The assembly and disassembly structure according to claim 4, the elastic component is configured to be a spring.

6. The assembly and disassembly structure according to claim 3, wherein the elastic component is disposed between the stop piece and the foot stand.

7. The assembly and disassembly structure according to claim 6, the elastic component is configured to be a spring.

8. The assembly and disassembly structure according to claim 3, the elastic component is configured to be a spring.

9. The assembly and disassembly structure according to claim 3, the elastic component is configured to be an elastic rubber block.

10. The assembly and disassembly structure according to claim 2, the elastic component is configured to be a spring.

11. The assembly and disassembly structure according to claim 2, the elastic component is configured to be an elastic rubber block.

12. The assembly and disassembly structure according to claim 1, the elastic component is configured to be a spring.

13. The assembly and disassembly structure according to claim 1, the elastic component is configured to be an elastic rubber block.

14. The assembly and disassembly structure according to claim 1, wherein the fixing stand is provided with a fixing groove, and the insert is configured to be a clamped piece located in the fixing groove and extending out of the fixing groove.

15. The assembly and disassembly structure according to claim 1, wherein the clamped piece is formed integrally with the fixing stand.

16. The assembly and disassembly structure according to claim 1, wherein the clamped piece is formed separately from the fixing stand, and the clamped piece is configured to be an aluminum sheet.

17. A rotorcraft comprising a foot stand, an airframe and an assembly and disassembly structure, wherein the foot stand is disposed to a bottom of the airframe, the airframe has an accommodating groove disposed in a bottom wall thereof, a top wall of the accommodating groove is provided with a hole, and a side wall of the accommodating groove is provided with a clamping slot, and the assembly and disassembly structure comprises:
 a fixing stand fixedly connected to the foot stand and accommodated in the accommodating groove, wherein the fixing stand is provided with an insert and the insert is fitted into the clamping slot;
 a plug pin movably mounted into the fixing stand, wherein a portion of the plug pin passes through an upper surface of the fixing stand and forms an insertion end, and the insertion end matches the hole and is inserted into the hole; and
 an elastic component mounted in the fixing stand, connected to the plug pin, and configured to provide an elastic stress to push and press the plug pin so that the insertion end is embedded into the hole.

18. The rotorcraft according to claim 17, wherein the foot stand is provided with a connecting stand, the elastic component is limited between the connecting stand and a stop piece of the plug pin, and the fixing stand is in threaded connection with the connecting stand.

19. The rotorcraft according to claim 17, comprising two foot stands, wherein the two foot stands are arranged at the bottom of the airframe symmetrically with respect to a center line of the airframe, each of the foot stands has two connecting ends for the airframe, and each connecting end of each of the foot stands is provided with the assembly and disassembly structure.

20. The rotorcraft according to claim 18, comprising two foot stands, wherein the two foot stands are arranged at the bottom of the airframe symmetrically with respect to a center line of the airframe, each of the foot stands has two connecting ends for the airframe, and each connecting end of each of the foot stands is provided with the assembly and disassembly structure.

* * * * *